Jan. 25, 1949.   P. F. SCHOLANDER   2,459,843
SLING TYPE SEAT FOR AIRCRAFTS
Filed March 6, 1946   2 Sheets-Sheet 1

INVENTOR.
P. F. SCHOLANDER

Jan. 25, 1949. P. F. SCHOLANDER 2,459,843
SLING TYPE SEAT FOR AIRCRAFTS
Filed March 6, 1946 2 Sheets-Sheet 2

INVENTOR.
P. F. SCHOLANDER
BY
HIS ATTORNEYS

Patented Jan. 25, 1949

2,459,843

UNITED STATES PATENT OFFICE 2,459,843

SLING TYPE SEAT FOR AIRCRAFT

Per F. Scholander, Swarthmore, Pa.

Application March 6, 1946, Serial No. 652,479

10 Claims. (Cl. 244—122)

(Granted under the act of March 3, 1883, as amended April 30, 1928; 370 O. G. 757)

The invention described herein may be manufactured and used by or for the Government for governmental purposes without payment to me of any royalty thereon.

This invention relates to an improved seat for use in aircraft, and is particularly intended for use by a pilot or passenger equipped with a seat-pack parachute.

For safety purposes the occupants of aircraft are often furnished with a parachute and also a dinghy, or other collapsible life raft. These safety devices are frequently provided in the form of seat packs having straps for connecting the pack to the wearer. These seat packs form compact bundles which are usually interposed between the wearer and the seat, and which offer little comfort to the seat occupant. While this arrangement is the most obvious one, it has serious disadvantages which the present invention seeks to overcome by providing independent supporting means for the seat occupant and for the parachute and dinghy packs.

The primary object of the invention is to provide an aircraft seat which will offer a maximum of comfort to a seat occupant having a seat-pack parachute attached to his body by the usual harness.

It is a further object of the invention to provide an aircraft seat in the form of a sling secured to the parachute harness, and to provide means to detachably secure the sling to the aircraft seat framework.

A related object of the invention is to provide an aircraft seat arranged to provide direct support for the seat occupant, and having additional means for supporting a parachute pack and dinghy attached to the seat occupant.

Ancillary to the above objects of invention, a further object is to generally improve the construction of existing aircraft seats, in order to promote the safety and efficiency of aircraft personnel.

The above and other objects of invention will become apparent upon reading the following detailed description of the invention in connection with the drawings, in which.

Figure 1:
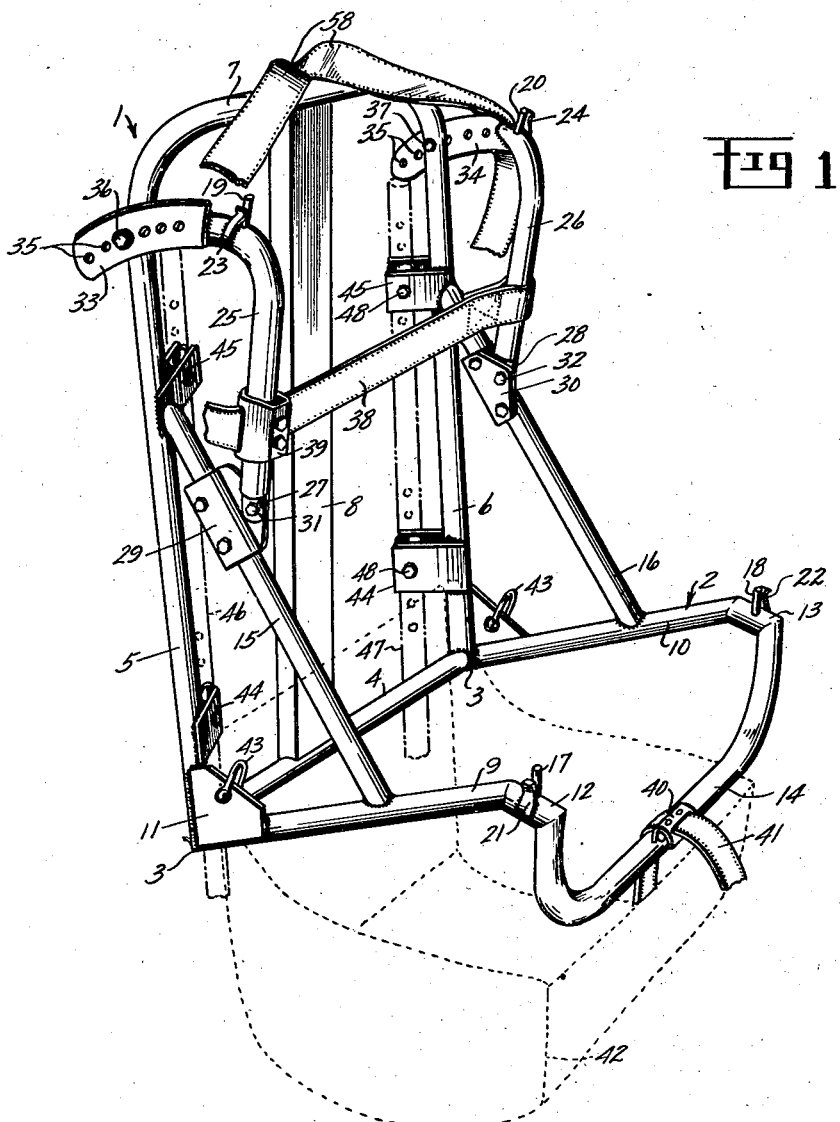
Fig. 1 is a perspective view showing the framework of the improved aircraft seat and showing also the parachute and dinghy supporting means in broken lines.

Referring to the drawing (Fig. 1) it will be noted that the seat framework comprises a back frame section 1 and a seat frame section 2 joined together in approximate right-angular relation, and these frame sections are tied together at the points of juncture 3 by means of a cross-bar 4. The frame section 1 is in the form of an arch having a pair of uprights 5 and 6 joined at their upper ends by a top member 7. The top member 7 and the cross-bar 4 are connected by a hollow upright 8 securely fixed, as by welding, at the upper and lower ends thereof.

The seat frame section 2 comprises a pair of side bars 9 and 10, rigidly connected to the uprights 5 and 6 at points of juncture 3. These joints 3 are further reinforced by means of gussets 11 which may be welded or brazed in place, as shown in Fig. 1. At their forward ends the bars 9 and 10 are rigidly secured to bars 12 and 13, which are in turn secured to the depressed tie bar 14. The uprights 5 and 6 and the side bars 9 and 10 are further secured in their correct angular relation by means of brace bars 15 and 16.

In order to releasably support the sling-type seat of the invention, the seat framework carries two lower pins 17 and 18, and two upper pins 19 and 20. As may be observed the lower pins 17 and 18 are extended upwardly from the bars 12 and 13 and adjacent to the pins there are mounted the retaining springs 21 and 22, which partially encircle the bars and are secured thereto by welding, or by extending the pins through a lower apertured end portion of each spring. Each spring includes an upper curled end portion adapted to contact an adjacent pin to retain an associated seat supporting ring on the pin. The upper seat supporting pins 19 and 20 are provided with retaining springs 23 and 24, the respective pins and springs being fixed on the adjustable bars 25 and 26. In each instance the pins 17 to 20 are preferably extended upwardly through apertures in the respective bars and are then fixed in place by welding, or by any other suitable means.

The adjustable bars or arms 25 and 26 are of bent tubular construction and have their lower end portions flattened at 27 and 28 to provide bearings in face-to-face contact with brackets 29 and 30 bolted to the brace bars 15 and 16. The bars 25 and 26 are pivotally secured to brackets 29 and 30 by means of bolts 31 and 32. The upper rearwardly turned ends of bars 25 and 26 are formed with flattened portions to which are welded extensions 33 and 34 of angular cross-sectional shape. These extensions are curved about the pivot bolts 31 and 32, and are also provided with a row of adjustment holes 35 each at the same distance from the respective pivot bolts. Each hole 35 is thus adapted to register with one of a pair of bolts 36 and 37 passing through uprights 5 and 6. A back-supporting strap 38 is secured to the left-hand adjustable bar 26 by means of a looped end on the strap, while the other end of the strap is held in adjusted position on the right-hand adjustable bar 25 by means of a clamp member 39, which when tightened on the bar takes a firm grip on the strap, as well as on the bar.

Centrally of the depressed tie bar 14 there is provided a clasp 40 serving to adjustably retain a strap 41 attached to a pack-supporting pocket or sling 42 made of canvas or other flexible sheet material, the pocket being shown in broken lines in Fig. 1. The pocket 42 is of any suitable shape, with sufficient depth to give some lateral support to the pack carried therein. The means of attachment for the rearward edge of the pocket comprises merely a hemmed portion on the pocket through which is passed a thin metal bar secured at its ends to the uprights 5 and 6.

Figure 2:
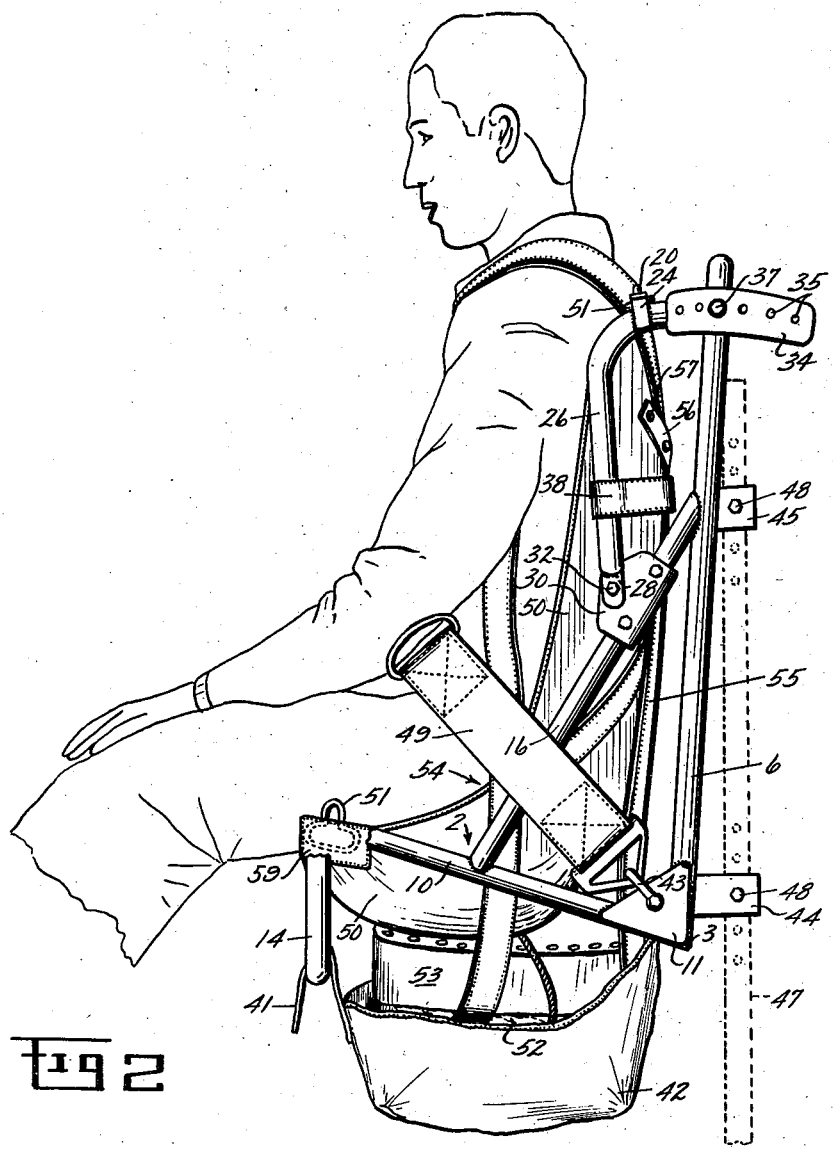
Fig. 2 is a side view of the improved aircraft seat in use, and showing a portion of the seat framework cut away.

Each of the corner reinforcing gussets 11 carries a pivotally mounted loop 43 providing anchoring means for the opposite ends of the safety belt, which is indicated at 49 in Fig. 2. Each end of the safety belt is permanently attached to its respective loop 43, and midway of the length the belt is provided with a buckle or clasp to permit separating the belt into two belt sections, thus releasing the seat occupant.

The seat as described above may be secured in position within the aircraft in various ways but a preferred form of mounting as shown comprises two lower brackets 44 and two upper brackets 45 each secured to one of the uprights 5 or 6. These brackets each are formed by a pair of spaced plates welded in place on opposite sides of one of the uprights, and each have a short section of tubing welded between the plates adjacent to the associated upright. Rigidly connected to the aircraft framework there are a pair of seat support members 46 and 47 of a diameter to just fit within the tubing sections forming portions of the brackets 44 and 45. The members 46 and 47 are provided adjacent each bracket with a series of adjustment apertures adapted to receive bolts 48 passing also through apertures in the brackets 44 and 45. There is thus provided a seat mounting for permitting a substantial up-and-down seat adjustment.

Having described the seat framework and parts thereof attention is now directed to Fig. 2 for an illustration of the complete invention. The means for supporting the seat occupant comprises a rectangular sheet of canvas or other material which forms a sling 50. The sling is provided with rings 51 at the four corners, these rings being adapted to fit over the pins 17, 18, 19 and 20 on the seat framework and snap past the retaining springs 21, 22, 23 and 24. As shown, the sling supported only at the four corners forms a continuous seat and back-rest for the seat occupant, while the parachute pack 52 and dinghy pack 53 are supported below the seat by means of the pocket 42. Attached to the parachute pack 52 there is the usual parachute harness 54 comprising a system of straps to support the wearer in a pendant position beneath the parachute when the emergency arises requiring its use. A pair of heavy straps or lift webs 55 forming part of the parachute harness are extended downwardly to the parachute pack where they make connection with the parachute shroud lines. The sling 50 is of course located between the person wearing the parachute and the parachute harness, and the sling may be and preferably is connected to the parachute harness.

To maintain the sling 50 in correct position relative to the parachute harness 54 there are provided short cross-straps 56 secured to the straps 55, and having snap fasteners 57 at each side of the straps 55 which make releasable connection with the sling 50 near the upper end thereof. Thus the sling and parachute harness are retained in connected relation, and with the harness in proper position on the wearer the sling will also be properly positioned. Therefore the person wearing the parachute will also wear the sling thereunder.

Besides being equipped with a safety belt 49 it is usually desirable to provide the seat occupant with shoulder straps 58 anchored to the seat framework, and adapted to extend forwardly over the seat occupant's shoulders and be secured to the parachute harness or to the safety belt or to portions of the seat framework. The shoulder straps serve the purpose of holding the aircraft pilot or passenger in an upright position under all conditions encountered in operating the aircraft.

With the seat occupied and with the safety belt and shoulder straps made secure (Fig. 2), the seat occupant is provided with a comfortable and adequate support which is free from any projections or irregularities. When the occupant desires to leave the seat it is first necessary to unfasten the shoulder straps and the safety belt. Then upon rising to a standing position the upper sling supporting rings 51 will automatically snap off the pins 19 and 20, following which the lower rings 51 will similarly snap off the pins 17 and 18. Each of the rings 51 are carefully sewed onto the sling 50 and the corners so equipped are each covered with a reinforcing patch 59 which serves to protect the stitches securing the ring in place (note the lower forward end of the sling in Fig. 2.)

The seat framework is preferably made of tubular members having welded joints, but any type of bars or structural elements may be used. The seat frame section 2 is disclosed as being composed of several sections welded together but it is clear that the same general shape could be produced by using a single length of bar or tubing properly bent and shaped. While the invention has been described as including means to support a parachute pack and a dinghy pack, it should be understood that these packs may contain various types of equipment or supplies of use to the person occupying the seat. In many cases only the parachute pack will be carried, since a collapsible life raft is only used for flights over water.

The embodiments of the invention herein shown and described are to be regarded as illustrative only and it is to be understood that the invention is susceptible to variations, modifications and changes within the scope of the appended claims.

What I claim is:

1. An aircraft seat for use by a seat occupant wearing a parachute harness having a seat-pack parachute attached thereto, said seat comprising a supporting frame having a back frame section and a seat frame section connected together, a brace at each side of the seat connected to the back frame section and seat frame section, an arm pivoted on each brace and extending upwardly and rearwardly therefrom, means adjustably connecting each arm to the back frame section adjacent the upper end thereof, a sling releasably connected to each of said arms and extending downwardly and forwardly thereof, the lower forward end of the sling being releasably connected to the seat frame section, and a pocket supported below the seat frame section and sling and being adapted to support the seat-pack parachute.

2. An aircraft seat for use by a seat occupant wearing a parachute harness having a seat-pack parachute attached thereto, said seat comprising a supporting frame having a back frame section and a seat frame section connected together, pairs of coupling elements near the upper end of the back frame section and near the forward end of the seat frame section, a sling element having coupling means at opposite ends for releasable engagement with said coupling elements, said seat frame section comprising an open framework with said sling element extending downwardly inside said open framework, and means supported below the seat frame section and sling for support of the seat-pack parachute independently of said sling element.

3. An aircraft seat for use by a seat occupant wearing a parachute harness having a seat-pack parachute attached thereto, said seat comprising a supporting frame having a back frame section and a seat frame section connected together, a pair of spaced upright members for rigid connection with the aircraft, means carried on the back frame section slidably and adjustably secured to said upright members, an arm adjustably connected to the back frame section at each side thereof, a sling connected to each of said arms and extending downwardly and forwardly thereof, the lower forward end of the sling being connected to the seat frame section, and a pocket supported below the seat frame section and sling and being adapted to support the seat-pack parachute independently of said sling.

4. An aircraft seat for use by a seat occupant wearing a parachute harness having a seat-pack parachute attached thereto, said seat comprising a supporting frame having a back frame section and a seat frame section connected together, a brace at each side of the seat connected to the back frame section and seat frame section, an arm pivoted on each brace and extending upwardly and rearwardly therefrom, means adjustably connecting each arm to the back frame section adjacent the upper end of the latter, a back-supporting strap connected between the arms, a sling connected to each of said arms above said strap and extending downwardly and forwardly in front of said strap, the lower forward end of the sling being connected to the seat frame section, and a pocket supported below the seat frame section and sling and being adapted to support the seat-pack parachute independently of said sling.

5. An aircraft seat for use by a seat occupant wearing a parachute harness having a seat-pack parachute attached directly to said harness, said seat comprising a supporting frame including a back frame section and a seat frame section, an occupant-supporting sling in the form of a rectangular sheet of fabric, means releasably connecting said sheet of fabric to the back frame section near the upper end of said back frame section and to the seat frame section near the forward end of said seat frame section, said sling being normally worn by said occupant under said parachute harness so as to directly support the seat occupant with said sling being supported only by said means, a pocket supported from the seat frame section and hanging below said section and below said sling, and said seat-pack parachute being normally carried within said pocket independently of said sling when the occupant is using said seat.

6. An aircraft seat for use by a seat occupant wearing a parachute harness having a parachute pack attached directly to said harness, said seat comprising a supporting frame including a back frame section and a seat frame section, an occupant-supporting sling in the form of a rectangular sheet of fabric, means releasably connecting two corners of said rectangular sheet of fabric to the back frame section near the upper end of said back frame section, means releasably connecting the other two corners of said sheet of fabric to the seat frame section near the forward end of said seat frame section, said sling being normally worn by said occupant under said parachute harness so as to directly support the seat occupant with said sling being supported only by said means, and means secured to said supporting frame for carrying the weight of said parachute pack independently of said sling and harness when the occupant is using said seat.

7. An aircraft seat for use by a seat occupant wearing a parachute harness having a parachute pack attached directly to said harness, said seat comprising a supporting frame including a back frame section and a seat frame section, an occupant-supporting sling in the form of a rectangular sheet of fabric, means releasably connecting two corners of said rectangular sheet of fabric to the back frame section near the upper end of said back frame section, means releasably connecting the other two corners of said sheet of fabric to the seat frame section near the forward end of said seat frame section, said sling being normally worn by said occupant under said parachute harness so as to directly support the seat occupant with said sling being supported only by said means, and means retaining said sling and portions of said parachute harness in a predetermined relative position with respect to each other.

8. An aircraft seat for use by a seat occupant wearing a parachute harness having a seat-pack parachute attached directly to said harness, said seat comprising a supporting frame including a back frame section and a seat frame section, an occupant-supporting sling in the form of a rectangular sheet of fabric, means releasably connecting two corners of said rectangular sheet of fabric to the back frame section near the upper end of said back frame section, means releasably connecting the two other corners of said sheet of fabric to the seat frame section near the forward end of said seat frame section, said sling being normally worn by said occupant under said parachute harness so as to directly support the seat occupant with said sling being supported only by said means, a pocket supported from the seat frame section and hanging below said section and below said sling, and said seat-pack parachute being normally carried within said pocket independently of said sling when the occupant is using said seat.

9. An aircraft seat for use by a seat occupant wearing a parachute harness having a seat-pack parachute attached directly to said harness, said seat comprising a supporting frame including a back frame section and a seat frame section, an arm adjustably connected to the back frame section at each side thereof and extending forwardly, an occupant-supporting sling in the form of a rectangular sheet of fabric, means releasably connecting two corners of said rectangular sheet of fabric to the arms at each side of the back frame section, means releasably connecting the two other corners of said sheet of fabric to the seat frame section near the forward end of said seat frame section, said sling being normally worn by said occupant under said parachute harness so as to directly support the seat occupant with said sling being supported only by said means, a pocket supported from the seat frame section and hanging below said section and below said sling, and said seat-pack parachute being normally carried within said pocket independently of said sling when the occupant is using said seat.

10. An aircraft seat for use by a seat occupant wearing a parachute harness having a seat-pack parachute attached directly to said harness, said seat comprising a supporting frame including a back frame section and a seat frame section, an occupant-supporting sling in the form of a rectangular sheet of fabric, a sling-supporting ring at each corner of said rectangular sheet of fabric, means comprising upright pins on said frame sections for releasably connecting the rings on said sheet of fabric to the back frame section near the upper end of said back frame section and to the seat frame section near the forward end of said seat frame section, said sling being normally worn by said occupant under said parachute harness so as to directly support the seat occupant with said sling being supported only by said rings and said pins, a pocket supported from the seat frame section and hanging below said section and below said sling, and said seat-pack parachute being normally carried within said pocket independently of said sling when the occupant is using said seat.

PER F. SCHOLANDER.

REFERENCES CITED

The following references are of record in the file of this patent:

UNITED STATES PATENTS

| Number | Name | Date |
|---|---|---|
| 604,212 | Palmer | May 17, 1898 |
| 1,261,063 | Slater | Apr. 2, 1918 |
| 1,899,668 | Campbell et al. | Feb. 28, 1933 |
| 1,955,687 | Scott | Apr. 17, 1934 |
| 2,192,113 | Waite | Feb. 27, 1940 |
| 2,312,946 | Watter | Mar. 2, 1943 |